N. SPOFFORD.
Bit-Brace.
No. 225,768. Patented Mar. 23, 1880.
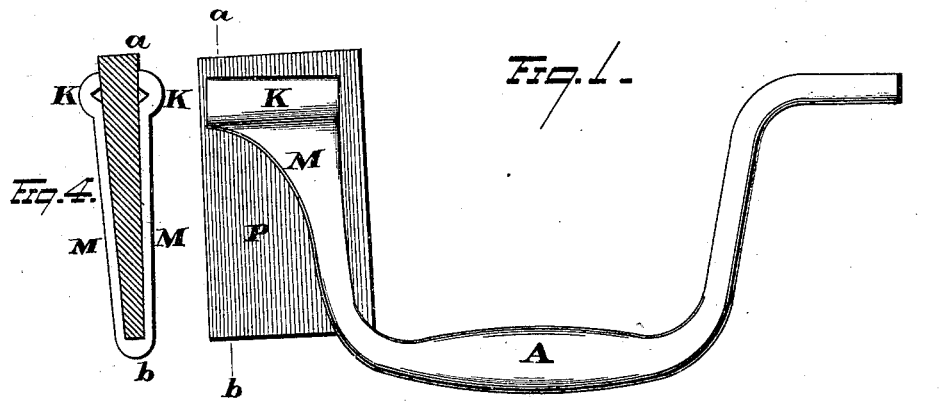
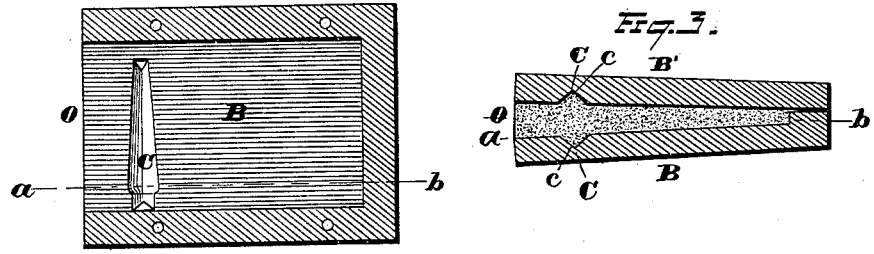
WITNESSES
E. J. Nottingham
A. M. Bright
INVENTOR
Nelson Spofford
By H. A. Seymour
ATTORNEY

UNITED STATES PATENT OFFICE.

NELSON SPOFFORD, OF HAVERHILL, MASSACHUSETTS.

BIT-BRACE.

SPECIFICATION forming part of Letters Patent No. 225,768, dated March 23, 1880.

Application filed September 22, 1879.

*To all whom it may concern:*

Be it known that I, NELSON SPOFFORD, of Haverhill, in the county of Essex and State of Massachusetts, have invented certain new and useful Improvements in Bit-Braces; and I do hereby declare the following to be a full, clear, and exact description of the invention, such as will enable others skilled in the art to which it pertains to make and use it, reference being had to the accompanying drawings, which form part of this specification.

My invention relates to an improvement in bit-braces.

Heretofore bit-braces formed with a divided socket in connection with a lower slitted arm have been made of wrought-iron and steel combined, the socket and lower arm being forged of steel in two parts and welded together, and then this portion again welded to the wrought-iron body of the brace. Bit-braces thus manufactured are sometimes defective, owing to a defective weld either at the portion of juncture of the slitted arm or slitted arm and wrought-iron body. The strain on the weld at the junction of the two slitted arms will cause the weld to part unless a perfect job has been effected. Again, another objectionable feature to bit-braces manufactured in the manner described is their undue initial cost, owing to the employment of high-priced material, steel, and wrought-iron, and, further, to the labor and skill necessitated in producing the article. Again, bit-braces have been cast solid and the slitted arm formed by milling. This method of manufacturing bit-braces is objectionable for the following reason: To preserve the strength and resiliency of an article made of cast metal it is necessary to preserve the skin of the casting intact, as the thin hard covering or skin that envelops the casting has the effect of imparting increased strength to the same. Hence, when the slit is formed in the arm of the bit-brace by cutting the metal away with a milling device, the interior portions of the arms are left without the skin metal that surrounds the outer portions of the arm, and thus the slitted arms materially weakened and their resiliency lessened to a considerable degree.

The object of my invention is to provide a bit-brace with a slitted arm, the entire brace formed without weld or seam and without having any portion of the metal cut away by milling, and the skin of the metal preserved intact; and to that end the invention consists in a bit-brace provided with a slitted arm and socket, and formed complete in casting, the entire surface of the article being enveloped by the skin metal formed in casting.

In the accompanying drawings, Figure 1 is a plan view of a bit-brace pattern with the core-prints inserted through the slitted socket and lower arm. Fig. 2 is a plan view of the lower portion of the core-box, the upper and corresponding part thereof being removed. Fig. 3 is a vertical longitudinal section of the core-box on the line $a\ b$ of Fig. 2. Fig. 4 is an edgewise view of the core-print shown in Fig. 1; and Fig. 5 is a view, in perspective, of my improved bit-brace.

A represents the body of the brace-pattern, made in the usual form. K is the divided socket, formed on the outer or free ends of the arm composing the slitted arm M. P is the core-print, which forms a part of the pattern A, and is designed to be inserted between the two halves of the divided or split socket K and the slitted lower arm up to the body of the pattern A. The core-print P is made wedge-shaped or thicker at the socket portion than at the opposite end, in order to form the space between the divided socket of greater width than the space between the slitted arm near the juncture of the latter and body of the brace, and thereby insure a certain range of adjustability for the insertion of different-sized bits, and also to prevent fracture of the parts in the necessary manipulation.

The core-box is made in two parts, as illustrated in Fig. 3, B' representing the upper portion, and B the lower portion. Fig. 2 represents the lower portion with the upper part, B', removed. Cavities $c\ c$ are formed in the upper and lower portions of the core-box, and serve to form the projections $c\ c$ on the core, as shown in Fig. 3, for the purpose of forming corresponding cavities at the socket end of the brace-casting, and finally constituting the receptacle for the bit-shank in the finished brace, the other portion of the core serving to divide the socket and lower arm into two equal and similar parts.

In casting my improved bit-brace the pattern A, in connection with the core-print P, Fig. 1, is first molded in the usual manner. Core is then formed by forcing sand into the core-box B B' at the open end O. The upper portion, B, of the core-box is then removed and the core detached and transferred to the cavity in the mold formed by the core-print P. The upper part of the flask being then adjusted, the molten metal is poured in and a complete casting of a bit-brace with a split or divided socket and slitted lower arm is produced.

M represents the improved bit-brace. The arms m m' are formed slightly diverging to admit of their being contracted and expanded sufficiently to admit of the insertion of varying-sized bits. The arms m m' are not weakened, as results when they are welded or milled, as hereinbefore described, and possess the desired degree of resiliency, as the skin metal envelops every portion of their surfaces.

I have described suitable apparatus for casting my improved bit-brace, but would have it understood that I do not confine myself to any particular apparatus for casting, as my invention consists in the article having the characteristics described, irrespective of any particular means employed in its production.

Having fully described my invention, what I claim as new, and desire to secure by Letters Patent, is—

A casting for bit-braces having springing or yielding cast-metal arms, which are enveloped on all sides by the skin metal of the casting, substantially as set forth.

In testimony that I claim the foregoing I have hereunto set my hand this 17th day of September, 1879.

NELSON SPOFFORD.

Witnesses:
JOHN S. SPOFFORD,
JOHN T. DESMOND.